United States Patent
Chen et al.

(10) Patent No.: US 10,360,505 B2
(45) Date of Patent: Jul. 23, 2019

(54) APPLYING A PLURALITY OF RULES TO A MULTIPLICITY OF STREAMING MESSAGES TO PERFORM INTELLIGENT DATA ANALYTICS

(71) Applicant: International Business Machines Corporation, Armonk, NY (US)

(72) Inventors: Xiao Yan Chen, Beijing (CN); Yao Liang Chen, Shanghai (CN); Sheng Huang, Shanghai (CN); Yun Jie Qiu, Shanghai (CN); Xiao Min Xu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 15/622,827

(22) Filed: Jun. 14, 2017

(65) Prior Publication Data
US 2018/0365569 A1    Dec. 20, 2018

(51) Int. Cl.
| G06F 15/167 | (2006.01) |
| G06N 5/02 | (2006.01) |
| H04L 29/08 | (2006.01) |
| H04L 12/911 | (2013.01) |
| H04L 29/12 | (2006.01) |

(52) U.S. Cl.
CPC .............. *G06N 5/025* (2013.01); *H04L 47/82* (2013.01); *H04L 67/12* (2013.01); *H04L 61/2007* (2013.01)

(58) Field of Classification Search
CPC .................................................. G06F 16/2228
See application file for complete search history.

(56) References Cited

U.S. PATENT DOCUMENTS

| 7,546,234 | B1 | 6/2009 | Deb et al. |
| 9,244,903 | B2 | 1/2016 | Huang et al. |
| 2012/0005144 | A1 | 1/2012 | Cutler et al. |
| 2014/0372593 | A1 | 12/2014 | Mann et al. |
| 2018/0246988 | A1* | 8/2018 | Johnson .............. G06F 16/9038 |
| 2018/0260467 | A1* | 9/2018 | Stewart ............... G06F 16/2228 |

OTHER PUBLICATIONS

Waylay.IO, "Waylay engine—one rules engine to rule them all", http://www.waylay.io/blog-one-rules-engine-to-rule-them-all.html, printed on Apr. 25, 2017, 10 pages.

* cited by examiner

*Primary Examiner* — Phuoc H Nguyen
(74) *Attorney, Agent, or Firm* — Scully, Scott, Murphy & Presser, P.C.; Grant Johnson, Esq.

(57) ABSTRACT

A plurality of messages comprising a stream of sensed data is received from an Internet of Things (IoT) device. A plurality of rules is identified. Responsive to a received message of the plurality of messages, the plurality of rules are distributed into a rule index tree based upon a cost model which minimizes a cost for analyzing the plurality of rules to determine whether or not each of the plurality of rules can be applied to the received message. The rule index tree is used to identify a set of rules of the plurality of rules that can be applied to the received message. The set of rules is applied to the received message to generate an outgoing message.

20 Claims, 10 Drawing Sheets

APPLYING A PLURALITY OF RULES TO A MULTIPLICITY OF STREAMING MESSAGES TO PERFORM INTELLIGENT DATA ANALYTICS

FIELD

The present application relates generally to data analytics and, more particularly, to apparatuses, methods, and computer program products for efficiently applying a plurality of rules to intelligently process a multiplicity of streaming messages that include sensed data.

BACKGROUND

The Internet of Things (IoT) is a network of interrelated objects configured for gathering and exchanging data. Data is gathered using any combination of electronics, software, sensors or actuators. The gathered data is exchanged over a network interface configured for communicating over the Internet. Each of the objects is assigned a unique identifier, such as an Internet Protocol (IP) address. The objects may include physical devices, computing devices, digital machines, mechanical machines, vehicles, household appliances, or any of various combinations thereof. Alternatively or additionally, the objects may include animals, plants, or people that are equipped with sensors and network interfaces. In fact, using the IoT approach, any object equipped with an on-off switch may be connected to the Internet. Some illustrative examples of objects include smartphones, coffee makers, washing machines, refrigerators, headphones, lamps, radios, televisions, laptop computers, desktop computers, tablets, wearable devices, jet engines, oil drilling rigs, automobiles, trucks, trains, doors, access gates, livestock, and agricultural machinery.

A multitude of practical applications exist for interconnected objects. For example, assume that an individual is driving to an important meeting. The vehicle has access to the individual's calendar, and is able to use information about the date and time of the meeting to determine the best route to take. If heavy traffic is encountered, the vehicle may automatically initiate a text message to other meeting participants notifying them of the delay. Likewise, an interconnected clock radio may be configured for notifying a coffee maker to start brewing coffee as soon as the alarm function of the clock radio is triggered. Similarly, an office copy machine may keep track of paper and ink toner levels, and automatically re-order these items when supplies are running low.

In many IoT scenarios, analytic tasks are often based on simple rule comparisons. For instance, assume that an infant's body is equipped with a temperature sensor and a communications interface for automatically sending streaming messages including instantaneous sensed temperature over the Internet on a periodic or repeated basis over time. The sensed temperature may be incorporated into a time series of streamed messages that includes other items of sensed data for the infant in addition to body temperature. For purposes of illustration, these other items may include a sensed heart rate, a sensed breathing rate, a sensed ambient temperature, a sensed ambient humidity level, a sensed geographic position, and sensed audio information. It is desired to generate and send an alert to an infant's parents when the body temperature of the infant exceeds 100 degrees Fahrenheit for at least five minutes, or when the sensed audio information exceeds a predetermined level for at least ten seconds, or if a change in geographic position of greater than one meter is detected.

The foregoing scenario raises several technical challenges. A number of rules may need to be applied to the streaming messages, and a high data throughout for the sensed temperature and audio information needs to be achieved. In many real-world applications, several rules to thousands of rules may need to be contemporaneously applied to each streaming message. The streaming messages may occur a very high throughput, possibly involving a million data points or more per second. Likewise, the time series may include a large number of dimensions in the sense that each message may include a multiplicity of different data attributes. Different types of comparisons may need to be made, such as value comparisons versus spatial comparisons. Moreover, in some situations, the rules may change dynamically.

It is difficult to build a rule engine that indexes a multiplicity of rules where the rules encompass differing levels of complexity. One category of existing rule engines is organized into a plurality of levels, where each level is associated with a corresponding attribute. Thus, it takes a constant amount of time to compare the multiplicity of rules to a received message in order to locate a subset of rules of the multiplicity of rules that are applicable to the received message. This topology only supports value comparisons, and is not suitable when the value range of an attribute is large, occupying too much space in the rule engine. The space cost increases exponentially with increases in the number of attributes. There is a high cost for performing dynamic rule updates for attributes near upper hierarchical levels of the rule engine.

Another category of existing rule engine provides a content-based communication service using a content-based network. A content-based network is an overlay network that includes routers for performing specialized routing and forwarding functions. This approach may be used to perform different types of comparisons, and large numbers of attributes are supported. However, there is a very high latency when complicated routing functions need to be performed by the specialized content-based network. Moreover, this approach is very inefficient when a massive number of rules are similar but not identical.

Existing rule engine operations, such as pattern match and Discrete Fourier Transformation (DFT), are complicated and not suited for computation sharing. Load balancing approaches are challenging to implement because different rules have different computational complexities. A simple rule should not be associated with the same price as a complex rule, nor should all complex rules be associated with the same price. Accordingly, pricing each of the rules appropriately is a difficult task to perform. Thus, there exists a need to overcome at least one of the preceding deficiencies and limitations of the related art.

SUMMARY

The following summary is merely intended to be exemplary. The summary is not intended to limit the scope of the claims.

A computer-implemented method, in one aspect, may comprise receiving a plurality of messages from an Internet-enabled device such as an Internet of Things (IoT) device, the plurality of messages comprising a stream of sensed data; identifying a plurality of rules; responsive to a first received message of the plurality of messages, distributing the plurality of rules into a first rule index tree based upon a first cost model which minimizes a first cost for analyzing the plurality of rules to determine whether or not each of the plurality of rules can be applied to the first received message; using the first rule index tree to identify a first set of one or more rules of the plurality of rules that can be applied to the first received message; applying the first set of one or more rules to the first received message to generate a first outgoing message; responsive to a second received message of the plurality of messages, distributing the plurality of rules into a second rule index tree based upon a second cost model which minimizes a second cost for analyzing the plurality of rules to determine whether or not each of the plurality of rules can be applied to the second received message; using the second rule index tree to identify a second set of one or more rules of the plurality of rules that can be applied to the second received message; and applying the second set of one or more rules to the second received message to generate a second outgoing message.

A computer program product, in another aspect, may comprise a computer-readable storage medium having a computer-readable program stored therein, wherein the computer-readable program, when executed on a processor, causes the processor to receive a plurality of messages from an Internet-enabled device such as an Internet of Things (IoT) device, the plurality of messages comprising a stream of sensed data; identify a plurality of rules; responsive to a first received message of the plurality of messages, distribute the plurality of rules into a first rule index tree based upon a first cost model which minimizes a first cost for analyzing the plurality of rules to determine whether or not each of the plurality of rules can be applied to the first received message; use the first rule index tree to identify a first set of one or more rules of the plurality of rules that can be applied to the first received message; apply the first set of one or more rules to the first received message to generate a first outgoing message; responsive to a second received message of the plurality of messages, distribute the plurality of rules into a second rule index tree based upon a second cost model which minimizes a second cost for analyzing the plurality of rules to determine whether or not each of the plurality of rules can be applied to the second received message; use the second rule index tree to identify a second set of one or more rules of the plurality of rules that can be applied to the second received message; and apply the second set of one or more rules to the second received message to generate a second outgoing message.

An apparatus, in another aspect, may comprise a processor and a memory coupled to the processor, wherein the memory comprises instructions which, when executed by the processor, cause the processor to receive a plurality of messages from an Internet-enabled device such as an Internet of Things (IoT) device, the plurality of messages comprising a stream of sensed data; identify a plurality of rules; responsive to a first received message of the plurality of messages, distribute the plurality of rules into a first rule index tree based upon a first cost model which minimizes a first cost for analyzing the plurality of rules to determine whether or not each of the plurality of rules can be applied to the first received message; use the first rule index tree to identify a first set of one or more rules of the plurality of rules that can be applied to the first received message; apply the first set of one or more rules to the first received message to generate a first outgoing message; responsive to a second received message of the plurality of messages, distribute the plurality of rules into a second rule index tree based upon a second cost model which minimizes a second cost for analyzing the plurality of rules to determine whether or not each of the plurality of rules can be applied to the second received message; use the second rule index tree to identify a second set of one or more rules of the plurality of rules that can be applied to the second received message, and apply the first set of one or more rules to the second received message to generate a second outgoing message.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1A:
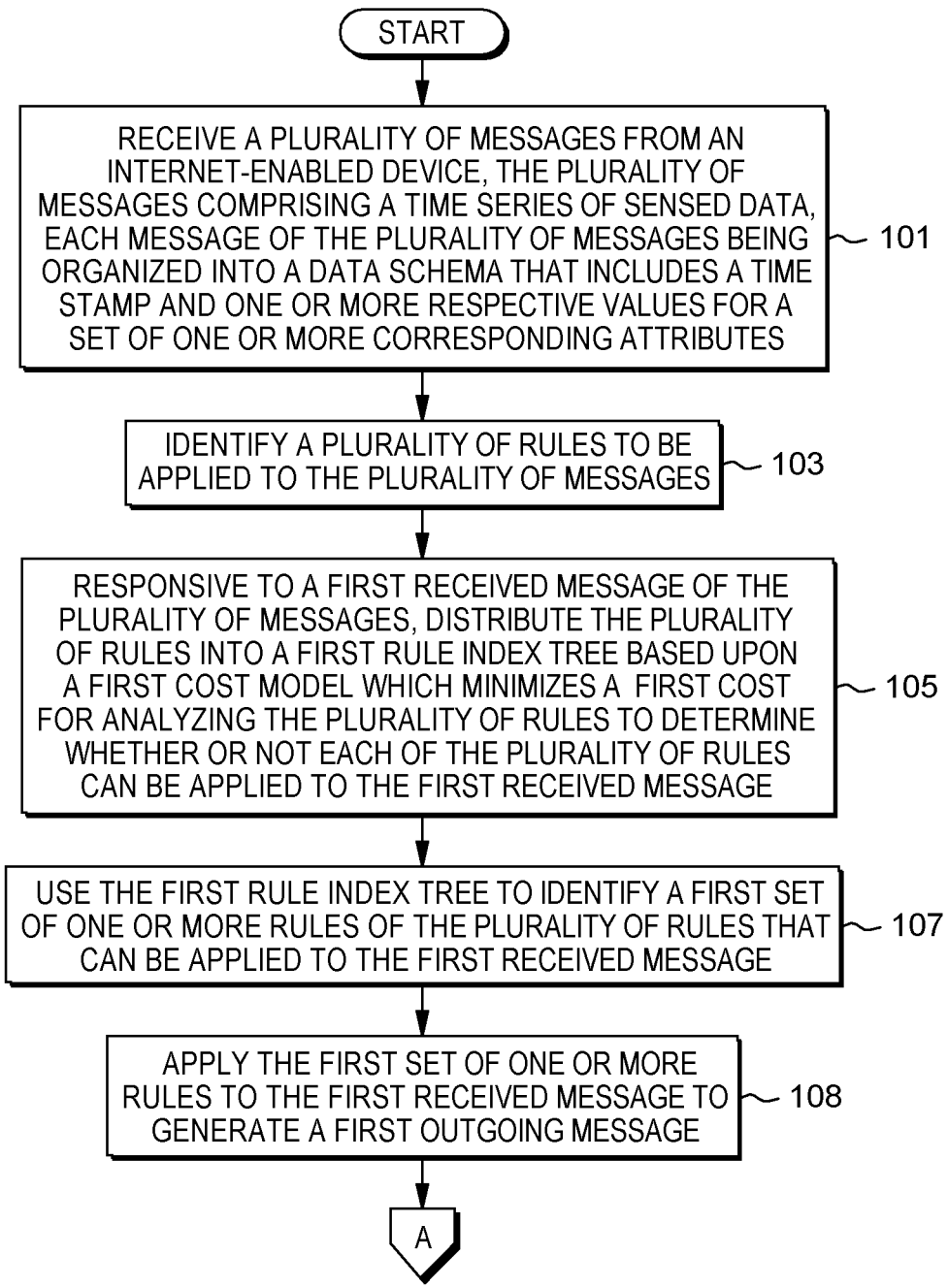
FIGS. 1A and 1B together comprise a flowchart illustrating an exemplary method for efficiently applying a plurality of rules to a multiplicity of streaming messages to perform intelligent data analytics in accordance with one set of embodiments of the present disclosure.
Figure 1B:
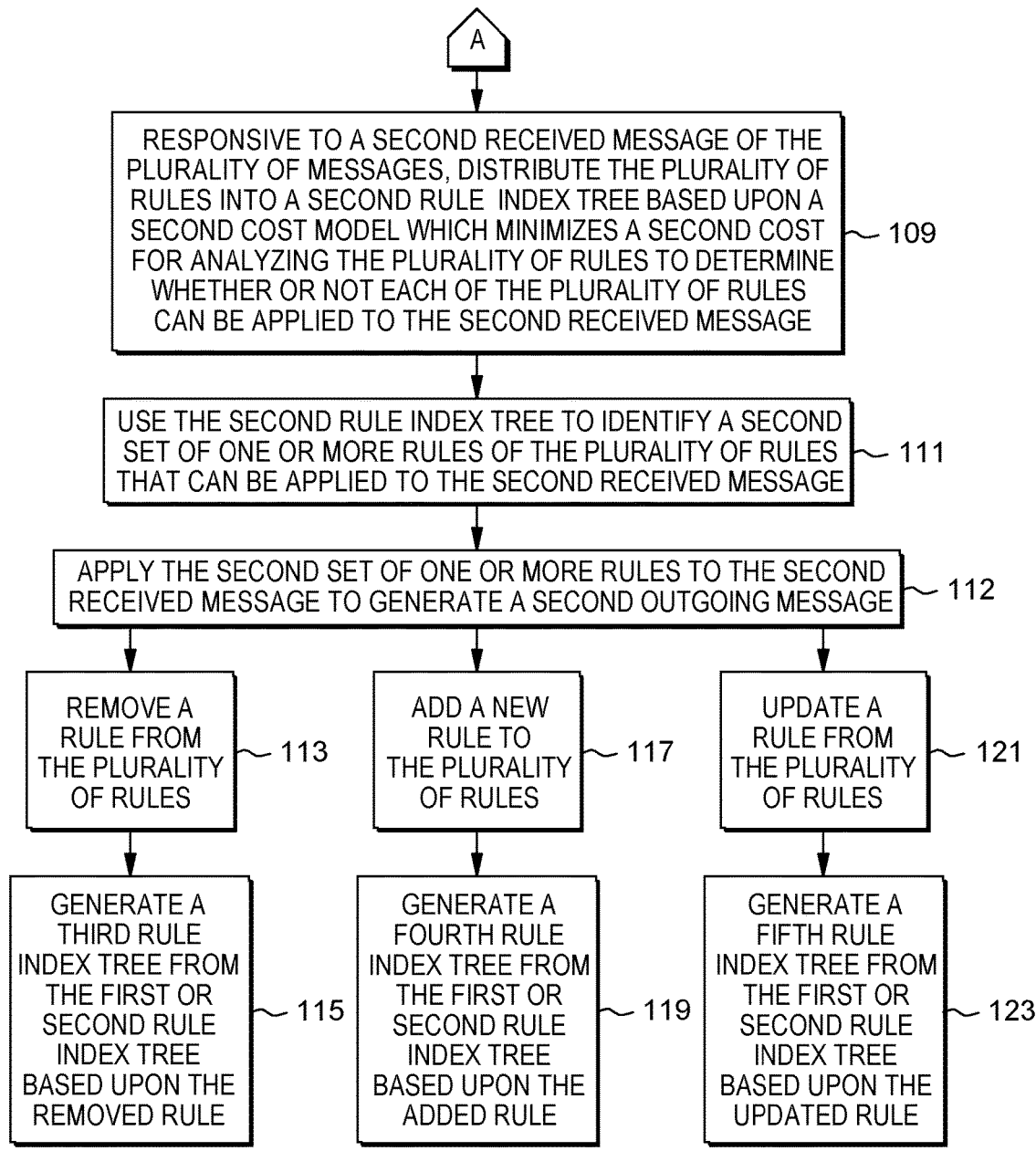

FIGS. 1A and 1B together comprise a flowchart illustrating an exemplary computer-implemented method for efficiently applying a plurality of rules to a multiplicity of streaming messages to perform intelligent data analytics in accordance with one set of embodiments of the present disclosure. The method may, but need not, be performed substantially in real time. The method commences at block 101 (FIG. 1A) where a plurality of messages are received from an Internet-enabled device such as an Internet of Things (IoT) device. Alternatively or additionally, the messages could be received from a cellular network, a computer network, or another type of network that is not Internet-enabled. The plurality of messages comprises a time series of sensed data.

Each message is organized into a data schema that includes a time stamp and one or more respective values for a set of one or more corresponding attributes $\{\alpha_i\}$. An attribute $\alpha$ may include a single number (for example, a temperature or a voltage), or a string (for example, a name or an address), or a combination of a number and a string (such as a latitude and a longitude). The data schema, represented mathematically as $s=\{\alpha_1, \alpha_2, \ldots, \alpha_k\}$, defines a format for each message of the time series, where $\alpha_i$ is the $i^{th}$ attribute of the time series. An acceptable value range for $\alpha_i$ is denoted as $V\alpha_i$.

Next, at block 103, a plurality of rules is identified. A rule r is a conjunction of one or more comparison functions $F=\{f\}$ defined on the data schema $s=\{\alpha_i\}$. A comparison function $f(\alpha_i, v)$ accepts a value for an attribute $\alpha_i$ and outputs a Boolean value (true or false) given the data schema $s=\{\alpha_i\}$. A true set T for $f(\alpha_i, v)$ is defined as $T(f(\alpha_i, v))=\{v|v \in V\alpha_i \text{ and } f(\alpha_i, v)=true\}$. For example, if f(temperature, v)=(if V>37), the true set is [37, positive infinity). A true set $T(\alpha_i, r)$ is defined as $\cap \cdot T(f(\alpha_i, v))$, where $f(\alpha_i, v) \in F$ is the true set of rule r. For example, consider a rule r $\{f_1=(v>37), f_2=(v<50)\}$. In this example, the true set T is (37, 50).

Figure 4:
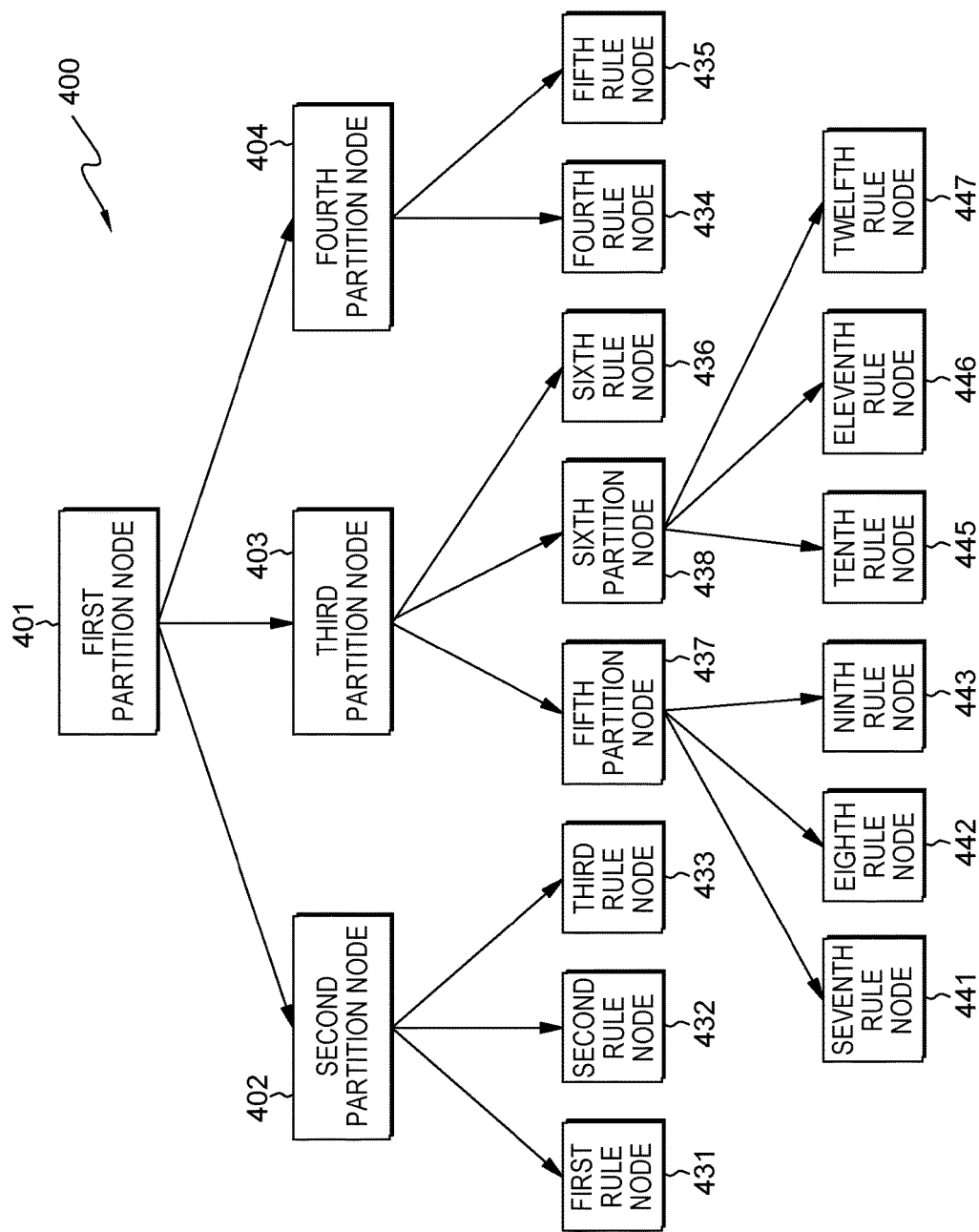
FIG. 4 is a data structure diagram of an exemplary rule index tree for use with the method of FIGS. 1A and 1B.

At block 105, responsive to a first received message of the plurality of messages, the plurality of rules is distributed into a first rule index tree based upon a first cost model which minimizes a first cost for determine whether or not each of the plurality of rules can be applied to the first received message. An exemplary data structure for the rule index tree is illustrated in FIG. 4, to be described in greater detail hereinafter.

Returning to FIG. 1A, at block 107, the first rule index tree is used to identify a first set of one or more rules of the plurality of rules that can be applied to the first received message. A rule in the plurality of rules can be applied to the first received message if the rule can be matched to the first received message, or if the rule fits the first received message. Given a set of rules $R=\{r\}$ defined on the data schema s, R is indexed such that, for a data message m of s, all of the rules that fit m can be identified. Next, at block 108, the first set of one or more rules is applied to the first received message to generate a first outgoing message.

The operational sequence advances to block 109 (FIG. 1B) where, responsive to a second received message of the plurality of messages, the plurality of rules is distributed into a second rule index tree based upon a second cost model which minimizes a second cost to determine whether or not each of the plurality of rules can be applied to the second received message. As previously mentioned, FIG. 4 includes an exemplary data structure for the rule index tree. Next, at block 111 (FIG. 1B), the second rule index tree is used to identify a second set of one or more rules of the plurality of rules that can be applied to the second received message. The program then advances to block 112 where the second set of one or more rules is applied to the second received message to generate a second outgoing message.

The operations of blocks 113, 117, and 121 may be performed in any order or substantially contemporaneously. At block 113, a rule is removed from the plurality of rules. A third rule index tree is generated at block 115 from the first rule index tree or the second rule index tree based upon the removal of the rule. At block 117, a new rule is added to the plurality of rules. A fourth rule index tree is generated from the first rule index tree or the second rule index tree at block 119 based upon the addition of the new rule. At block 121, a rule from the plurality of rules is updated. Then, at block 123, a fifth rule index tree is generated from the first rule index or the second rule index based upon the updating of the rule. Thus, given an index of $R=\{r\}$, rules in the index of R can be updated, inserted, and/or deleted.

Figure 2:
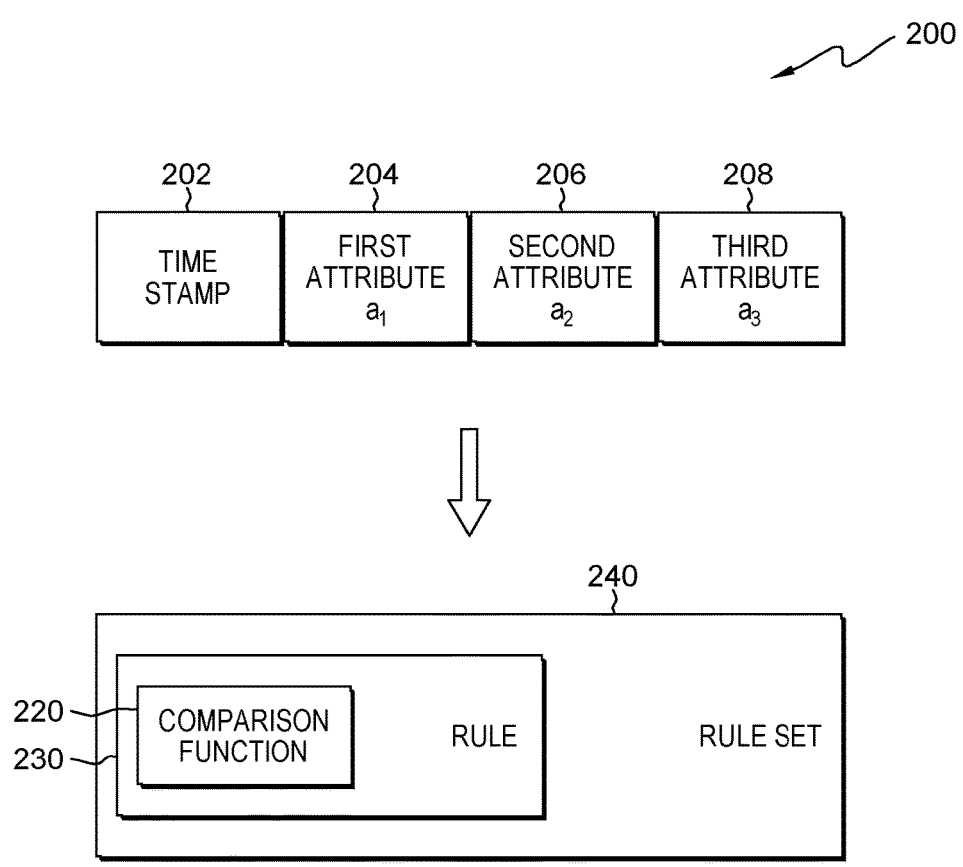
FIG. 2 is a data structure diagram of an illustrative data schema for use with the method of FIGS. 1A and 1B.

FIG. 2 is a data structure diagram of an illustrative data schema 200 for use with the method of FIGS. 1A and 1B. The data schema 200 (FIG. 2) presents an exemplary data structure for each of a plurality of messages, where the plurality of messages represents a time series of sensed data. More specifically, the data schema 200, which may be represented mathematically as $s=\{\alpha_1, \alpha_2, \ldots, \alpha_k\}$, defines a format for each message of the time series, where $a_i$ is the $i^{th}$ attribute of the time series.

With reference to FIG. 2, the data schema 200 includes a time stamp 202 and one or more respective values for a set of one or more corresponding attributes $\{\alpha_i\}$. For purposes of illustration, the attributes includes a first attribute $\alpha_1$ 204, a second attribute $\alpha_2$ 206, and a third attribute $a_3$ 208. The first attribute $\alpha_1$ 204 comprises a temperature value, the second attribute $\alpha_2$ 206 comprises a humidity value, and the third attribute $\alpha_3$ 208 is a complex attribute that comprises a first value representing a latitude and a second value representing a longitude. In general, an attribute $\alpha$ may include a single number (for example, the temperature value or the humidity value), or a string (for example, an address), or a combination of a number and a string (such as the latitude and the longitude).

An acceptable value range for an attribute $a_i$ is denoted mathematically as $Va_i$. For example, the first attribute $a_1$ 204, representing the temperature value, has an acceptable value range $Va_1$ of [0.0, 100.0]. Likewise, the second attribute $a_2$ 206, representing the humidity value, has an acceptable value range $Va_2$ of [0%, 100%]. The third attribute $a_3$ 208, representing the latitude and the longitude, has an acceptable value range $V\alpha_3$ of [−180.0, 180.0] for the latitude and [−180.0, 180.0] for the longitude.

In the context of the first attribute $\alpha_1$ 204, the second attribute $\alpha_2$ 206, and the third attribute $\alpha_3$ 208, an illustrative example of a time series including a first message and a second message is as follows. At 11:00 AM on May 1, 2015, the first message is generated by an Internet-enabled device: {TS_key: 1, Time: 2015-05-01 11-00, Temperature: 37.2, Humidity 40%, Long_Lati: [40.123, 107.143]}. Next, at 12:00 PM on May 1, 2015, the second message is generated by the Internet-enabled device: {TS_key: 1, Time: 2015-05-01 12-00, Temperature: 33.2, Humidity 35%, Long_Lati: [40.121, 107.145]}. A time series includes at least two messages and, in practice, may include hundreds or thousands of messages.

A set of comparison functions 220 are formulated for the data schema 200. Conceptually, the set of comparison functions 220 may be regarded as a subset of a rule 230, and the rule 230 may be regarded as a subset of a rule set 240. An example of a set of comparison functions 220 includes a first function $f_1$ (Temperature, v)={v>=37}, a second function $f_2$ (Temperature, v)={v<40}, and a third function $f_3$ (Long_Lati, pos)={pos within circle_area [(40, 107), 1]}. A true set is determined for each of the comparison functions 220. For $f_1$, the true set is [37, 100]. For $f_2$, the true set is [0, 40). For $f_3$, the true set is x,y: $(x-40)^2+(y-107)^2<1$.

A set of rules 240 is formulated from the comparison functions 220. An example of a set of rules 240 includes a first rule $r_1=\{f_1, f_2\}$: Temperature >=37 & Temperature <40, and a second rule $r_2=\{f_3\}$: Long_Lati within circle_area[(40, 107), 1]. A true set for the set of rules 240 is Temp: [37, 40), and Long_Lati: same as $f_3$.

Figure 3:
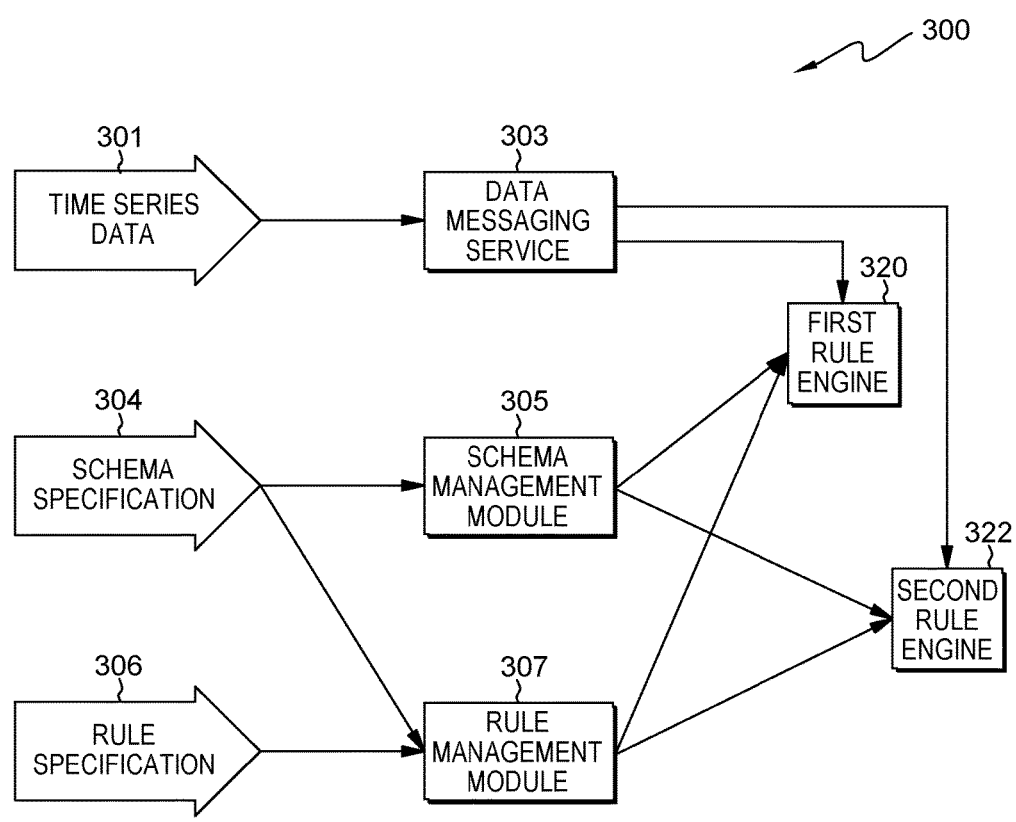
FIG. 3 shows an illustrative system architecture for efficiently applying a plurality of rules to a multiplicity of streaming messages to perform intelligent data analytics in accordance with one set of embodiments of the present disclosure.

FIG. 3 shows an illustrative system architecture 300 for efficiently applying a plurality of rules to a multiplicity of messages to provide intelligent data analytics in accordance with one set of embodiments of the present disclosure. Time series data 301 is received by a data messaging service 303. A schema specification 304 for one or more schemas is received by a schema management module 305. The schema specification 304 may be received, for example, from a system administrator. A rule specification 306 for one or more rules is received by a rule management module 307. The rule specification 306 may be received, for example, from one or more users. The data messaging service 303, schema management module 305, and rule management module may each be implemented using one or more special-purpose processors operatively coupled to a computer-readable memory device, a computer server, a personal computer, a laptop computer, or another type of computing device.

A plurality of rule engines, such as a first rule engine 320 and a second rule engine 322, each receive information identifying one or more schemas from the schema management module 305. In addition, the first rule engine 320 and the second rule engine 322 each receive information identifying one or more rules from the rule management module 307. The first rule engine 320 and the second rule engine 322 are each configured for generating one or more rule index trees.

FIG. 4 is a data structure diagram of an exemplary rule index tree 400 for use with the method of FIGS. 1A and 1B. The rule index tree 400 is used to index the rule set R defined on the data schema s in response to receiving a data message. Two types of nodes are represented in the rule index tree—partition nodes and rule nodes. Partition nodes partition a set of rules R into groups $\{R_i\}$, which may be conceptualized as child nodes, using a single attribute. Rule nodes contain a set of rules R.

For example, a first partition node 401 partitions a set of rules into a plurality of child nodes based upon a first attribute a. For purposes of illustration, allowable values $V_a$ for attribute α are defined to be in the range of [0, 100]. The plurality of child nodes includes a second partition node 402, a third partition node 403, and a fourth partition node 404. The second partition node 402 includes a range of [1, 20] for the attribute α. The third partition node 403 includes a range of [20, 80] for the attribute a. Likewise, the fourth partition node 404 includes a range of [80, 100] for the attribute α.

The second partition node 402 partitions the range of [0, 20] for attribute a into a plurality of rule nodes, such as a first rule node 431, a second rule node 432, and a third rule node 433. Similarly, the fourth partition node 404 partitions the range of [80, 100] for attribute α into a plurality of rule nodes, such as a fourth rule node 434 and a fifth rule node 435.

The third partition node 403 performs a partitioning into a plurality of child nodes based upon a second attribute b. For purposes of illustration, allowable values $V_b$ for attribute b are defined to be in the range of [0, 37]. The plurality of child nodes of the third partition node 403 comprises a fifth partition node 437 for the range of [0, 10] of attribute b, a sixth partition node 438 for the range of [10, 20] of attribute b, and a sixth rule node 436 for the range of [20, 37] of attribute b.

The fifth partition node 437 performs a further partitioning into a seventh rule node 441, an eighth rule node 442, and a ninth rule node 443. Likewise, the sixth partition node 438 performs a further partitioning into a tenth rule node 445, an eleventh rule node 446, and a twelfth rule node 447.

The partitioning included in the rule index tree 400 is determined on a cost-driven basis. Each of a respective plurality of comparison functions f is associated with a corresponding cost function c(f). A cost for a rule c(r) in the set of rules R is defined as the sum of ($\{f_j | f_j \in r\}$). For example, define c(f(x)=(if x>NUM))=1, where NUM is a positive integer. Then, following this definition, the cost of an illustrative rule {α>10 and b>13} is 2. Mathematically, a cost function of any partition node, such as the second partition node 402, is given as $C_P(PN, \alpha)$ where rules are partitioned by the attribute a. Likewise, a cost function of any rule node, such as the seventh rule node 441, is given as $C_R(RN)$. $C_P(PN, \alpha)$ and $C_R(RN)$ are defined based upon c(r) as discussed previously.

Figure 5:
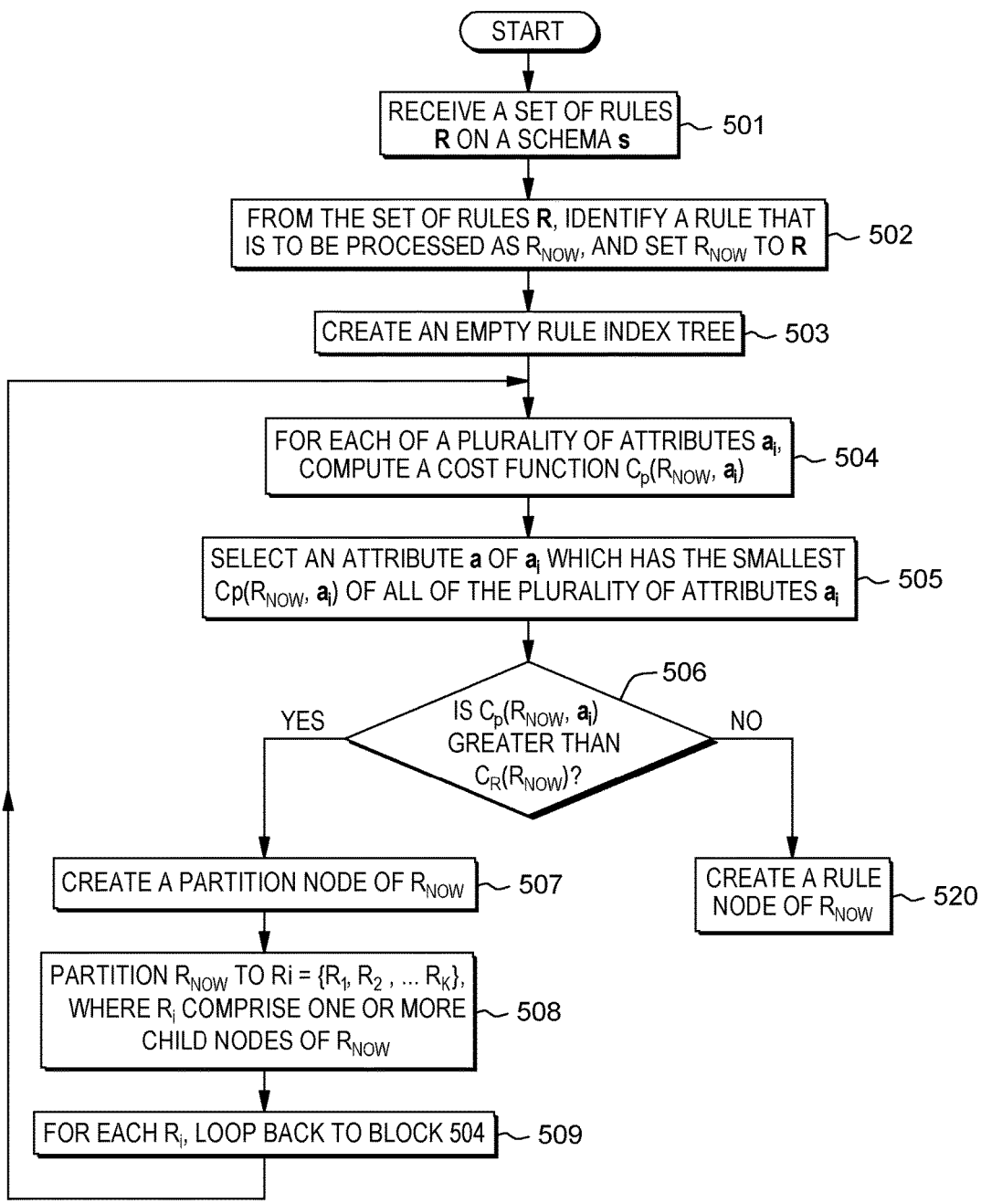
FIG. 5 is a flowchart illustrating an exemplary method for generating a rule index tree by distributing the plurality of rules into a rule index tree according to a cost model in accordance with one set of embodiments of the present disclosure.

FIG. 5 is a flowchart illustrating an exemplary method for generating a rule index tree by distributing the plurality of rules into a rule index tree according to a cost model in accordance with one set of embodiments of the present disclosure. At block 501, a set of rules R on a schema s are received. Next, at block 502, a rule of the set of rules R that is to be processed is identified as $R_{NOW}$, and $R_{NOW}$ is set to R. At block 503, an empty rule index tree is created. For each of a plurality of attributes $\alpha_i$, a cost function $C_P(R_{NOW}, \alpha_i)$ is computed (block 504). Then, at block 505, an attribute α of $\alpha_i$ is selected which has the smallest $C_P(R_{NOW}, \alpha_i)$ of all of the plurality of attributes $\alpha_i$.

At block 506, a test is performed to ascertain whether or not $C_P(R_{NOW}, \alpha)$ is greater than $C_R(R_{NOW})$. If not, the program advances to block 520 where a rule node of $R_{NOW}$ is created. The affirmative branch from block 506 leads to block 507 where a partition node of $R_{NOW}$ is created. Then $R_{NOW}$ is partitioned to $R_i = \{R_1, R_2, \ldots, R_k\}$, where R, are child nodes of $R_{NOW}$ (block 508). Then, at block 509, for each $R_i$ of block 508, the program loops back to block 504, and steps 504 through 509 are repeated.

Figure 6:
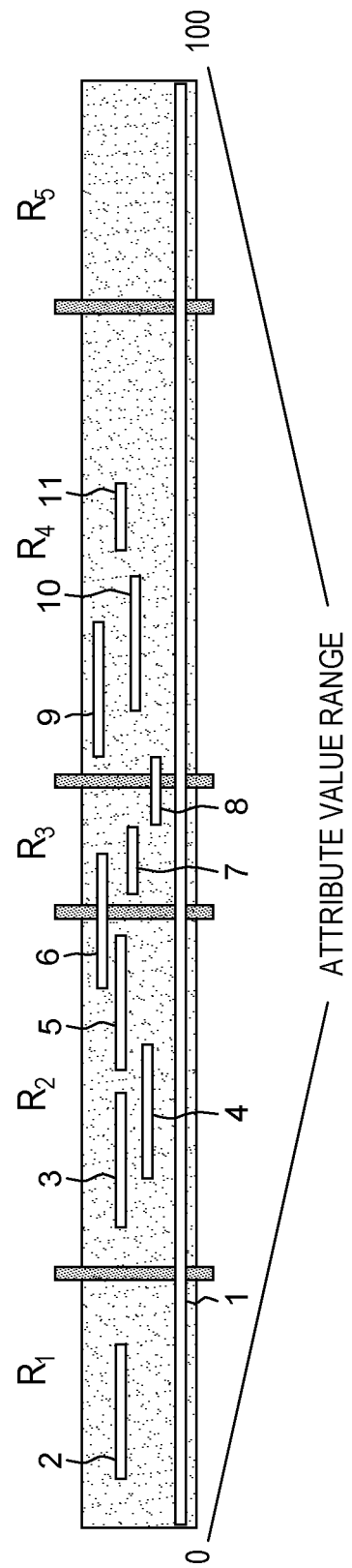
FIG. 6 is a data structure diagram illustrating an exemplary partitioning of an attribute for use with any of the methods of FIG. 1A, 1B, or 5.

FIG. 6 is a data structure diagram illustrating an exemplary partitioning of an attribute for use with the method of FIG. 5. More specifically, FIG. 6 illustrates an exemplary partitioning 600 of $R_{NOW}$ to $\{R_1, R_2, R_3, R_4, \text{and } R_5\}$ on the attribute a of $a_i$ as was described previously with reference to block 508 (FIG. 5). In the illustrative example of FIG. 6, the range of the attribute α is from 0 to 100. A plurality of true sets i are identified by rule identifiers. For example, the plurality of true sets may include a first true set 1, a second true set 2, a third true set 3, a fourth true set 4, a fifth true set 5, a sixth true set 6, a seventh true set 7, an eighth true set 8, a ninth true set 9, a tenth true set 10, and an eleventh true set 11.

Following the example of FIG. 6, $R_{NOW}$={the first true set 1, the second true set 2, the third true set 3, the fourth true set 4, the fifth true set 5, the sixth true set 6, the seventh true set 7, the eighth true set 8, the ninth true set 9, the tenth true set 10, and the eleventh true set 11}. A first partition $R_1$={the first true set 1 and the second true set 2}. Likewise, a second partition $R_2$={the first true set 1, the third true set 3, the fourth true set 4, the fifth true set 5, and the sixth true set 6}. Similarly, a third partition $R_3$={the first true set 1, the sixth true set 6, the seventh true set 7, and the eighth true set 8}. A fourth partition $R_4$={the first true set 1, the eighth true set 8, the ninth true set 9, the tenth true set 10, and the eleventh true set 11}. A fifth partition $R_5$={the first true set 1}. The true set i represents the rule $r_i$.

The cost function of a partition node with respect to an attribute is determined as follows: $\text{Cost}(PN_{R_{now}}) = \log(|\{R_i\}|) + \max\{\Sigma C(R_i)\}$. Thus, in the example of FIG. 6, $\text{Cost}(PN_{R_{now}}) = \log(5) + 5$, assuming that each rule contains only one comparison function with a cost of 1.

Figure 7:
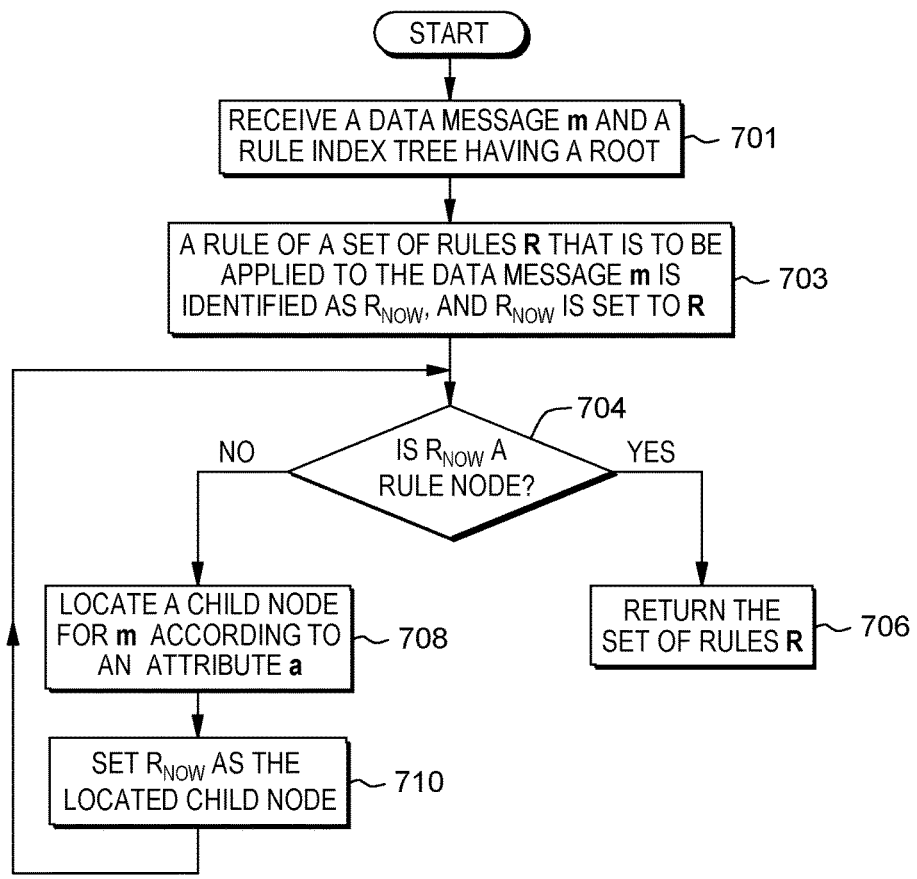
FIG. 7 is a flowchart illustrating an exemplary method for performing message filtering to achieve intelligent data analytics in accordance with one set of embodiments of the present disclosure.

FIG. 7 is a flowchart illustrating an exemplary method for performing message filtering to provide intelligent data analytics in accordance with one set of embodiments of the present disclosure. The method commences at block 701 where a data message m and a rule index tree having a root are received. Then, at block 703, a rule of a set of rules R that is to be applied to the data message m is identified as $R_{NOW}$, and $R_{NOW}$ is set to R. At block 704, a test is performed to ascertain whether or not $R_{NOW}$ is a rule node—that is, a node that contains a set of rules R. If so, the set of rules R are returned in $R_{NOW}$ (block 706). The negative branch from decision block 704 leads to block 708 where a child node for m, according to an attribute a, is located. $R_{NOW}$ is set as the located child node (block 710). The method then loops back to block 704 where the test to ascertain whether or not $R_{NOW}$ is a rule node is repeated for the child node that was located at block 710. If the negative branch from decision block 704 is followed, blocks 708 and 709 are performed, or if the affirmative branch from decision block 704 is followed, block 706 is performed.

Any of the methods of FIGS. 1A, 1B, 5, and 7 may be utilized in conjunction with dynamic cost optimization. If $Cost(PN) > \alpha \Sigma Cost(C(r))$, a sub-tree of PN is constructed using rule indexing, where r∈PN, and α is a user-specifiable parameter.

Any of the methods of FIGS. 1A, 1B, 5, and 7 may be utilized in conjunction with tree index simplification. If a partition node shares an identical partitioning attribute with its parent node, the partition node and its parent node are merged into a single node. For example, assume that we have a first node which is a Parent partition node PN on a first attribute. The partitions of the first node are as follows: [0, 100]=>{[0,20), [20, 80], (80, 100]}. We have a second node which is a child partition node PN where the partitions on the first attribute are [20, 80]=>{[20, 40), [40, 80]}. The first and second nodes can be merged together as follows: {[0,20), [20, 40), [40, 80], (80, 100])}.

Any of the methods of FIGS. 1A, 1B, 5, and 7 may be utilized in conjunction with rule simplification. The rules in a rule node can be simplified according to an ancestor node of the rule node. For example, a rule (a>10 and b>50) from a partition group a∈[30, 50] can be simplified to (b>50). Moreover, simplified rules can be merged if two different rules, when simplified, become identical rules.

Figure 8:
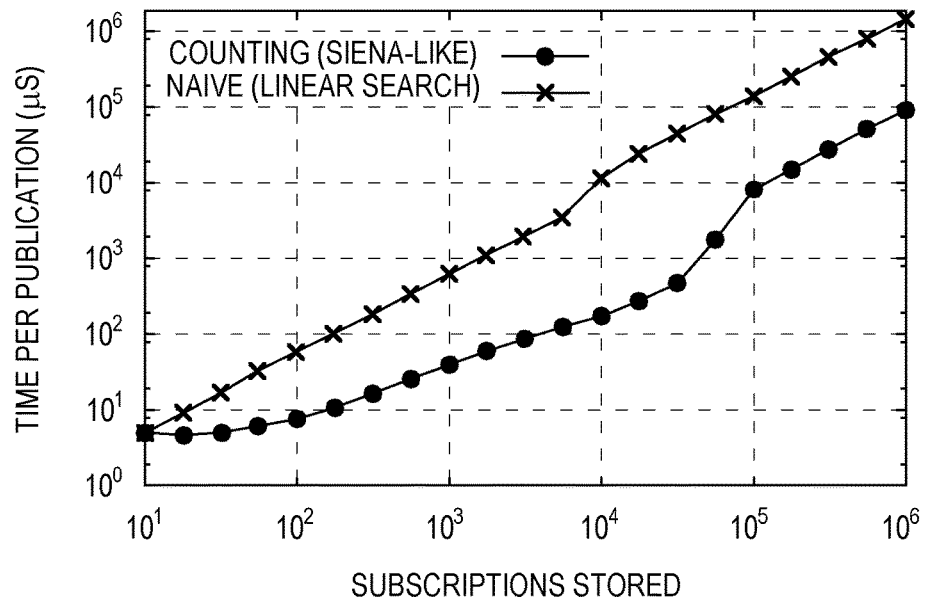
FIG. 8 is a graph illustrating time per publication versus subscriptions stored for an exemplary implementation of existing approaches.
Figure 9:
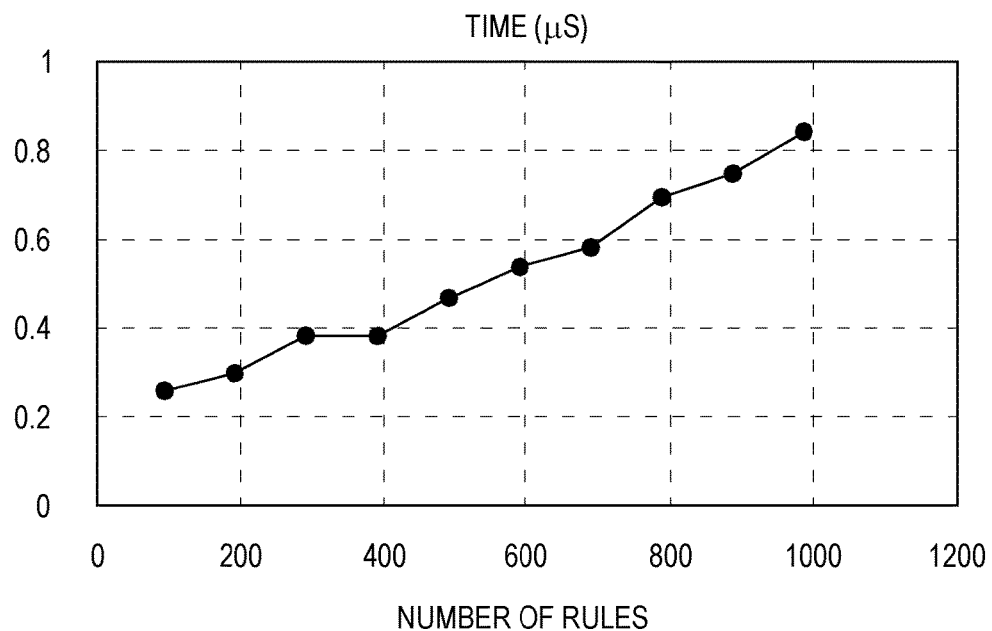
FIG. 9 is a graph illustrating time versus number of rules for an exemplary implementation of the method of FIGS. 1A and 1B.

FIG. 8 is a graph illustrating time per publication versus subscriptions stored for an exemplary implementation of existing approaches, and FIG. 9 is a graph illustrating time versus number of rules for an exemplary implementation of the method of FIGS. 1A and 1B. These experimental results reveal that the procedure of FIGS. 1A and 1B is at least one order of magnitude faster than existing approaches.

Figure 10:
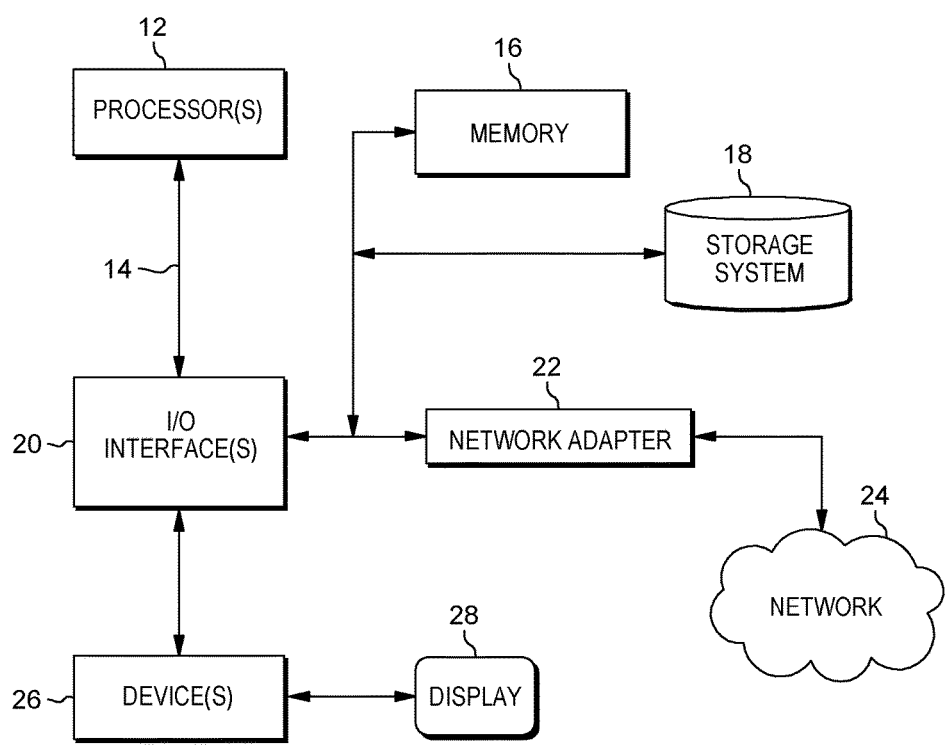
FIG. 10 is a block diagram showing an illustrative system architecture for efficiently applying a plurality of rules to a multiplicity of messages to perform intelligent data analytics in accordance with one set of embodiments of the present disclosure.

FIG. 10 is a block diagram showing an illustrative system architecture for efficiently applying a plurality of rules to a multiplicity of messages to perform intelligent data analytics in accordance with one set of embodiments of the present disclosure. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving a plurality of messages from an Internet of things (IoT) device, the plurality of messages comprising a stream of sensed data;
   identifying a plurality of rules;
   responsive to a first received message of the plurality of messages, distributing the plurality of rules into a first rule index tree based upon a first cost model which minimizes a first cost for analyzing the plurality of rules to determine whether or not each of the plurality of rules can be applied to the first received message;
   using the first rule index tree to identify a first set of one or more rules of the plurality of rules that can be applied to the first received message;
   applying the first set of one or more rules to the first received message to generate a first outgoing message;
   responsive to a second received message of the plurality of messages, distributing the plurality of rules into a second rule index tree based upon a second cost model which minimizes a second cost for analyzing the plurality of rules to determine whether or not each of the plurality of rules can be applied to the second message;
   using the second rule index tree to identify a second set of one or more rules of the plurality of rules that can be applied to the second received message; and
   applying the second set of one or more rules to the second received message to generate a second outgoing message.

2. The computer-implemented method of claim 1 further comprising:
   removing one or more rules from the plurality of rules; and
   generating a third rule index tree from the first or second rule index tree based upon the one or more removed rules.

3. The computer-implemented method of claim 1 further comprising:
   adding or updating one or more rules of the plurality of rules; and
   generating a fourth rule index tree from the first or second rule index tree based upon the one or more added or updated rules.

4. The computer-implemented method of claim 1 wherein the first rule index tree and the second rule index tree each include at least one partition node and at least one rule node.

5. The computer-implemented method of claim 1 further comprising configuring at least one of the first rule index tree or the second rule index tree with a partition node and a parent node to the partition node, and in response to the partition node sharing an identical partitioning attribute with the parent node, merging the partition node and the parent node into a single node.

6. The computer-implemented method of claim 1 wherein the first received message and the second received message each include a time stamp associated with one or more attributes.

7. The computer-implemented method of claim 1 wherein each of the plurality of rules comprises a conjunction of one or more comparison functions defined on a data schema.

8. A computer program product comprising a computer-readable storage medium having a computer-readable program stored therein, wherein the computer-readable program, when executed on a processor, causes the processor to:
   receive a plurality of messages from an Internet of Things (IoT) device, the plurality of messages comprising a stream of sensed data;
   identify a plurality of rules;
   responsive to a first received message of the plurality of messages, distribute the plurality of rules into a first rule index tree based upon a first cost model which minimizes a first cost for analyzing the plurality of rules to determine whether or not each of the plurality of rules can be applied to the first received message;
   use the first rule index tree to identify a first set of one or more rules of the plurality of rules that can be applied to the first received message;
   apply the first set of one or more rules to the first received message to generate a first outgoing message;
   responsive to a second received message of the plurality of messages, distribute the plurality of rules into a second rule index tree based upon a second cost model which minimizes a second cost for analyzing the plurality of rules to determine whether or not each of the plurality of rules can be applied to the second message;
   use the second rule index tree to identify a second set of one or more rules of the plurality of rules that can be applied to the second received message; and
   apply the second set of one or more rules to the second received message to generate a second outgoing message.

9. The computer program product of claim 8 further configured for:
   removing one or more rules from the plurality of rules; and
   generating a third rule index tree from the first or second rule index tree based upon the one or more removed rules.

10. The computer program product of claim 8 further configured for:
    adding or updating one or more rules of the plurality of rules; and generating a fourth rule index tree from the first or second rule index tree based upon the one or more added or updated rules.

11. The computer program product of claim 8 wherein the first rule index tree and the second rule index tree each include at least one partition node and at least one rule node.

12. The computer program product of claim 8 further comprising configuring at least one of the first rule index tree or the second rule index tree with a partition node and a parent node to the partition node, and in response to the partition node sharing an identical partitioning attribute with the parent node, merging the partition node and the parent node into a single node.

13. The computer program product of claim 8 wherein the first received message and the second received message each include a time stamp associated with one or more attributes.

14. The computer program product of claim 8 wherein each of the plurality of rules comprises a conjunction of one or more comparison functions defined on a data schema.

15. An apparatus comprising a processor and a memory coupled to the processor, wherein the memory comprises instructions which, when executed by the processor, cause the processor to:
receive a plurality of messages from an Internet of Things (IoT) device, the plurality of messages comprising a stream of sensed data;
identify a plurality of rules;
responsive to a first received message of the plurality of messages, distribute the plurality of rules into a first rule index tree based upon a first cost model which minimizes a first cost for analyzing the plurality of rules to determine whether or not each of the plurality of rules can be applied to the first received message;
use the first rule index tree to identify a first set of one or more rules of the plurality of rules that can be applied to the first received message;
apply the first set of one or more rules to the first received message to generate a first outgoing message;
responsive to a second received message of the plurality of messages, distribute the plurality of rules into a second rule index tree based upon a second cost model which minimizes a second cost for analyzing the plurality of rules to determine whether or not each of the plurality of rules can be applied to the second message;
use the second rule index tree to identify a second set of one or more rules of the plurality of rules that can be applied to the second received message; and
apply the second set of one or more rules to the second received message to generate a second outgoing message.

16. The apparatus of claim 15 further configured for:
removing one or more rules from the plurality of rules; and
generating a third rule index tree from the first or second rule index tree based upon the one or more removed rules.

17. The apparatus of claim 15 further configured for:
adding or updating one or more rules of the plurality of rules; and
generating a fourth rule index tree from the first or second rule index tree based upon the one or more added or updated rules.

18. The apparatus of claim 15 wherein the first rule index tree and the second rule index tree are each configured to include at least one partition node and at least one rule node.

19. The apparatus of claim 15 wherein at least one of the first rule index tree or the second rule index tree is configured with a partition node and a parent node to the partition node, and in response to the partition node sharing an identical partitioning attribute with the parent node, the apparatus is configured for merging the partition node and the parent node into a single node.

20. The apparatus of claim 15 wherein each of the plurality of rules comprises a conjunction of one or more comparison functions defined on a data schema.

* * * * *